United States Patent [19]

Brahms

[11] Patent Number: 5,253,290
[45] Date of Patent: Oct. 12, 1993

[54] CIRCUIT ARRANGEMENT FOR THE TRANSMISSION OF TELECOMMUNICATION SIGNALS

[75] Inventor: Martin Brahms, Hanover, Fed. Rep. of Germany

[73] Assignee: Ke Kommunications Elektronik, Hanover, Fed. Rep. of Germany

[21] Appl. No.: 662,918

[22] Filed: Mar. 1, 1991

[30] Foreign Application Priority Data

Mar. 3, 1990 [DE] Fed. Rep. of Germany ....... 4006739

[51] Int. Cl.$^5$ .......................................... H04M 1/74
[52] U.S. Cl. .................................. 379/399; 379/362; 379/416
[58] Field of Search ............... 379/399, 402, 362, 416, 379/359; 328/111

[56] References Cited

U.S. PATENT DOCUMENTS 4,164,713  8/1979  Brolin ................................ 328/111
4,527,016  7/1985  Sublette ............................. 379/359
4,636,588  1/1987  Nakayama et al. .................. 379/362

FOREIGN PATENT DOCUMENTS 1074034  3/1980  Canada .
3715552  5/1987  Fed. Rep. of Germany .

Primary Examiner—James L. Dwyer
Assistant Examiner—M. Shehata
Attorney, Agent, or Firm—Ware, Fressola, Van Der Sluys & Adolphson

[57] ABSTRACT

A connecting line is provided between a switching center and a subscriber for transmission of telecommunication signals. At the subscriber's end of the connecting line, there is located a device which, in addition to other passive and active units, includes a transformer, whose output winding is subdivided into two partial windings of identical size. A first capacitor, a switch and a second capacitor are connected in series between the partial windings. To prevent distortions of the dial pulses, a connecting line between the switch and the second capacitor is connected with a reference potential of the circuit arrangement.

3 Claims, 1 Drawing Sheet

CIRCUIT ARRANGEMENT FOR THE TRANSMISSION OF TELECOMMUNICATION SIGNALS

BACKGROUND OF THE INVENTION

1. Field of the Invention

The invention relates to a circuit arrangement for the transmission of telecommunication signals between a switching center of a telecommunication network and at least one subscriber.

2. Description of the Prior Art

In telecommunications networks, subscribers are connected to a switching center by means of a connecting line. At the subscriber's end of the connecting line, there is connected a device in which, in addition to other passive and active internal circuit elements, a direct-current source and a transformer with a core, an input winding, and an output winding are arranged. The input winding is connected with the connecting line via the internal circuit elements of the device. The output winding is connected to the subscriber by means of another connecting line. The output winding of the transformer is subdivided into two partial windings of identical size, between which there are connected a first capacitor and a switch connected in series with the windings. The switch is to be actuated by a component for detecting the loop current. The transformer is equipped with at least one additional winding, whose number of turns is equal to the total of the number of turns of the two partial windings. In the additional winding, the current flows in a direction opposite to that in which it flows in the two partial windings. The direct-current source is connected with one of the partial windings at the connection point of the first capacitor, with the interposition of the additional winding, as shown in German OS 37 15 552.

A circuit arrangement of this type is used, for example, in the so-called "PCM 2" process, in which two subscribers in adjacent locations of a telecommunication network are jointly connected to a switching center by means of a connecting line. The letters "PCM" stand for the known pulse code modulation process, by means of which telecommunication signals are transmitted as digital signals. The additional explanations apply to this process, representing all possible other cases of application of the invention.

In the PCM 2 process, analog signals are digitalized in the switching center and fed into the connecting line in coded form. At the end of the connecting line there is installed a device in which the incoming digital signals are decoded and transformed back into analog signals. This, of course, applies also to the opposite direction. The two subscribers are connected to the device by means of connecting lines. For each subscriber, the device contains a transformer whose input winding is connected to the connecting line with the interposition of an analog-digital converter and other circuit elements. Each particular subscriber is connected to the output winding of the transformer by means of a connecting line. Each subscriber is assigned his own direct-current source for supplying his telephone, which is connected at the output side of the transformer. Particularly in the cases where the subscribers are connected to the device by means of long connecting lines, interferences can be induced by external electric and magnetic fields, which can lead to cross-talk in other channels and to humming sounds.

To prevent these interferences, in the known circuit arrangement according to the previously mentioned German OS 37 15 552, the output winding of the transformer is subdivided into two partial windings of equal size, between which the first capacitor and the switch are connected in series. By dividing the output winding into two partial windings, the whole arrangement is made symmetrical in such a way that identical conditions always result for the forward and return lines of the connecting line with respect to a reference potential—for example, the ground. Interferences induced by electrical or magnetic fields can therefore no longer have an effect, regardless of the length of the connecting lines. The first capacitor makes certain that the direct current supplied flows only in the desired direction.

The brief interruptions in the feed current occurring during a dialing process cannot be rapidly determined by the component detecting the loop current, because current initially continues to flow through the first capacitor. It may therefore happen that the switch, depending on the capacity of the first capacitor, is opened with such a delay that a distortion of the dialing characters takes place. This can lead to wrong connections.

SUMMARY OF THE INVENTION

The invention is based on the task of further developing a circuit arrangement of the type described above in such a way that a distortion of the dialing characters during the dialing process can be prevented.

This task is carried out according to the invention by the fact that:

A second capacitor is inserted in series with the first capacitor and the switch, in such a way that the switch is located between the two capacitors, and The connecting line connecting the two capacitors via the switch is connected with the reference potential of the circuit arrangement between the switch and the second capacitor.

The connection with the reference potential located between the two capacitors results in the fact that the current coming from the direct-current source runs off to the reference potential during an interruption of the feed current by dialing pulses. The component detecting the loop current can thus determine the interruption of the loop current without significant delay, so that the switch located between the two capacitors is open. With this circuit arrangement supplemented by the second capacitor, it is thus made certain that the dialing pulses or dialing characters generated by the subscriber are not distorted. Wrong connections caused by distortions of the dial pulses will no longer occur.

DETAILED DESCRIPTION OF THE INVENTION

The invention is explained below for the known PCM 2 process, in which two subscribers are connected to a switching center by means of a common connecting line. In this process, data transmission is carried out on the connecting line in digital form; however, the invention also applies to only one subscriber or to more than two subscribers. It can also be applied in cases where the signals or data are transmitted in an analog mode on the connecting line.

Figure 1:
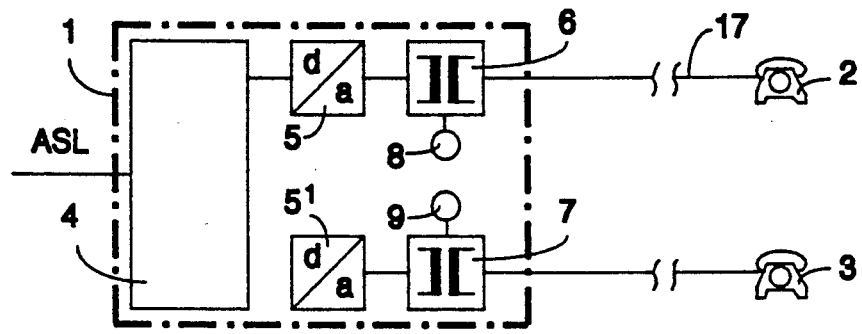
FIG. 1 is a schematic diagram of a circuit arrangement for the transmission of telecommunication signals with two subscribers.

In FIG. 1, a dash-and-dot line indicates a device 1, which is located at the end of a connecting line ASL and serves to connect two subscribers 2 and 3 of a telecommunication network to a switching center. Telecommunication signals or data are transmitted via the ASL in digital form between the subscribers 2 and 3 and the switching center (not shown). For this purpose, a number of standard active and passive internal circuit elements 4 are arranged in the device 1. The device 1 also contains two analog-digital converters 5 and 5', to which are connected transformers 6 and 7. The subscribers 2 and 3 are each connected to one of the transformers 6 and 7. For each transformer 6 and 7 and for each subscriber 2 and 3, a direct-current source 8 and 9 is also present in the device 1, which is supplied, for example, with a DC voltage of 20 V and, for example, supplies a current of 28 mA.

The circuit arrangement according to the invention is explained below for the subscriber 2. The same mode of action of the circuit arrangement also applies for the subscriber 3 or for only one subscriber or for more than two subscribers.

Figure 2:
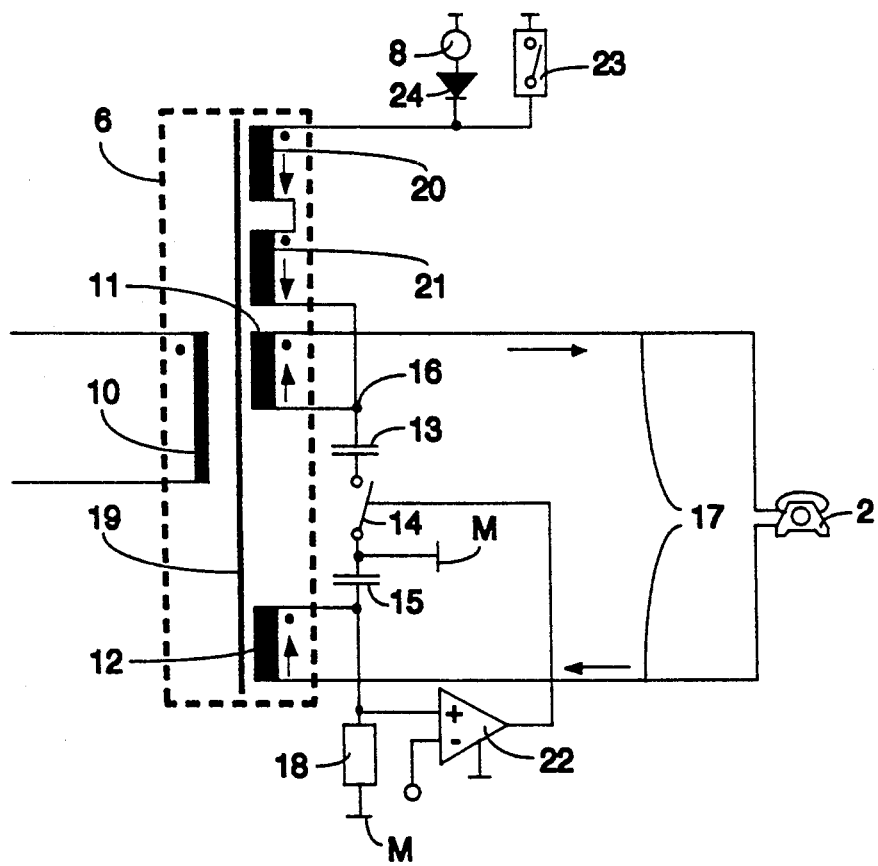
FIG. 2 is a schematic diagram of a circuit arrangement according to the invention for one subscriber.

The transformer 6, which is enclosed by a broken line in FIG. 2, consists of an input winding 10 and an output winding, which is subdivided into two partial windings 11 and 12 of identical size. The two partial windings 11 and 12 are connected to each other via a first capacitor 13, a switch 14, and a second capacitor 15, which are arranged in series. The current coming from the direct-current source 8 is fed into the partial winding 11, at the point 16 to which the first capacitor 13 is connected. In that case, a current flows in the direction of the arrows through the partial winding 11, the forward line of the connecting line 17 to the subscriber 2, and back through the return line of the connecting line 17 and the partial winding 12 via an ohmic resistor 18 to the reference potential M (ground) of the circuit arrangement. The current therefore passes through the two partial windings 11 and 12 in the same direction. For the analog signals to be transmitted, the two partial windings 11 and 12 act in the manner of a single winding, so that the subdivision is no obstacle to the signal transmission.

The core 19 of the transformer would be pre-magnetized by the current flowing through the partial windings 11 and 12. This could lead to distortions of the signals to be transmitted. To prevent this, the transformer 6 is equipped with at least one additional winding, whose total number of turns is equal to the total of the numbers of turns of the two partial windings 11 and 12. The additional winding preferably consists of two individual windings 20 and 21 of equal size, which are arranged in series and can be connected between the current source 8 and the point 16, the input point of the current into the partial winding 11. The current passes through the two individual windings 20 and 21 in the direction of the drawn-in arrows, that is, in the opposite direction from the partial windings 11 and 12.

The wires of the partial windings 11 and 12 and the wires of the individual windings 20 and 21, in a preferred embodiment, are wound simultaneously on the core 19, by simultaneously winding four insulated wires next to each other ("quadrofilar"). This results in the fact that the four windings are completely identical and symmetrical in structure. The effects of the currents of the four windings approximately cancel out, with a consideration of the direction of winding.

In addition to the current supply of the subscriber 2 from the direct-current source 8 that is required for signal transmission, a ring voltage is also transmitted with this circuit arrangement. The switch 14, which is controlled as a function of the loop current, is located in series with the capacitor 13. For this purpose, the loop current is detected by means of a suitable component. This can be, for example, an operational amplifier 22, which taps off a voltage proportional to the direct current through the resistor 18. In the resting state—that is, when the subscriber 2 is not telephoning—the switch 14 is open. The AC voltage coming from a ring voltage generator 23, which is superposed by DC voltage, can therefore be transmitted via the additional windings 20 and 21 and the partial winding 11 to the subscriber 2. As soon as the subscriber 2 picks up the receiver of his telephone, the DC circuit is closed and a loop current flows.

The switch 14 is then closed by a signal of the operational amplifier 22 and the circuit arrangement operates as previously described. The switch 14 is preferably in the form of an electronic switch. This may involve a transistor, for example, a bipolar transistor. The diode 24 serves as a voltage protection for the DC source 8 with respect to the ring voltage.

During a dialing process for establishing a telephone connection, the circuit arrangement according to FIG. 2 operates in the following manner:

When the subscriber 2 lifts up the receiver of his telephone, the feed current flows in the circuit of the connecting line 17. This feed current is detected by the operational amplifier 22, so that the switch 14 is closed. The dial pulses or dial characters then generated by the subscriber 2 result in brief interruptions of the feed current. The supply current coming from the DC source 8 is led off during the intervals between the dial pulses, during which no feed current flows, via the first capacitor 13 and the switch 14 and via the reference potential M. In that case, no further current flows through the resistor 18. This is detected by the operational amplifier 22, which opens the switch 14. In that case, a symmetrical circuit supplemented by the second capacitor 15 is present in the connecting line 17. A distortion of the dial pulses, with a corresponding wrong connection, cannot occur.

By connection of the reference potential M at a point located between the switch 14 and the second capacitor 15, it is made certain that the time constant of the circuit consisting of the second capacitor 15 and resistor 18 remains the same both during switching-on and during interruption of the feed current. The charge curve and the discharge curve of the second capacitor 15 intersect at one-half the level of the voltage that results in the steady state, with the loop current flowing. The operational amplifier 22 or the component detecting the loop current is adjusted to this level.

Instead of the individual capacitors 13 and 15, two or more condensers can also be connected in each case.

What is claimed is:

1. A circuit arrangement for the transmission of telecommunication signals between a switching center of a telecommunication network and a subscriber, who is connected to the switching center by means of a connecting line, in which, at the subscriber's end of the connecting line, there is connected a device in which, there is arranged a direct-current source and a transformer with a core, an input winding, and an output winding, whose output winding is connected to the connecting line via internal circuit elements of the device, and to whose output winding the subscriber is connected with a connecting line, in which the output winding of the transformer is subdivided into two partial windings of identical size, between which are connected a first capacitor and a switch arranged in series, said switch to be actuated by a component for detecting the loop current, in which the transformer is equipped with at least one additional winding, having a number of turns equal to the total of the turns of the two partial windings, and through which the current flows in a direction opposite to that in the partial windings, and in which the direct-current source is connected with one of the partial windings at the connection point of the first capacitor, characterized in that:

a second capacitor (15) is inserted in series with the first capacitor (13) and the switch (14), so that the switch (14) is located between the two capacitors (13, 15) and the connecting line connecting the two capacitors (13, 15) via the switch (14) is connected with the reference potential (M) of the circuit arrangement between the switch (14) and the second capacitor (15).

2. A circuit arrangement according to claim 1, characterized in that that a transistor, preferably a bipolar transistor, is used as the switch (14).

3. In a circuit arrangement for the transmission of telecommunication signals to a subscriber (2) connected to a connecting line (17), the subscriber (2) having coupled to the connecting line (17) a direct-current source (8, 24) and a transformer (6) with a core (19), an input winding (10), and an output winding (11, 12), the output winding (11, 12) being connected to the connecting line (17) and being subdivided into a first partial winding (11) and a second partial winding (12) each with an identical size, a first capacitor (13) and a switch (14) being arranged in series between the first partial winding (11) and the second partial winding (12), the switch (14) to be actuated by an operational amplifier (21) for the detection of a loop current, the transformer (60) having additional windings (20, 21) with a number of turns equal to a total of the turns of the two partial windings (11, 12) and having a current flow in a direction opposite to the first and second partial windings (11, 12), and the direct-current source (8, 24) being is connected to the first partial winding (11) at a connection point (16) of the first capacitor (13), wherein the improvement comprises:

a second capacitor (15) being connected in series with the first capacitor (13) and the switch (14) and having the switch (14) being located between the first and second capacitors (13, 15), and
  a reference potential (M) being connected between the switch (14) and the second capacitor (15).

* * * * *